United States Patent

Yrjönen et al.

[11] Patent Number: 5,306,914
[45] Date of Patent: Apr. 26, 1994

[54] METHOD FOR MEASURING LIQUID SCINTILLATION SAMPLES DEPOSITED ON MULTI-WELL SAMPLE PLATES

[75] Inventors: Tapio Yrjönen; Timo Oikari; Tuula Stark, all of Turku, Finland

[73] Assignee: Wallac Oy, Turku, Finland

[21] Appl. No.: 948,602

[22] Filed: Sep. 23, 1992

[51] Int. Cl.$^5$ .................... G01T 1/208; G01T 1/204
[52] U.S. Cl. ................................ 250/362; 250/328
[58] Field of Search ................. 250/362, 364, 328

[56] References Cited

U.S. PATENT DOCUMENTS

| | | | |
|---|---|---|---|
| 4,894,545 | 1/1990 | Dodson | 250/362 |
| 4,918,310 | 4/1990 | Rundt et al. | 250/362 |
| 5,225,680 | 7/1993 | Yrjönen et al. | 250/364 |

Primary Examiner—Paul M. Dzierzynski
Assistant Examiner—Richard Hanig
Attorney, Agent, or Firm—Adduci, Mastriani, Schaumberg & Schill

[57] ABSTRACT

A method for correcting measuring values when measuring liquid scintillation samples deposited on sample plates by a photodetector which will be affected by scintillation photons from other samples in the plate in addition to the sample being measured. Said correction is done by pre-determining affection of the other samples of the plate as a function of quench level and correcting observed measuring values using this information.

4 Claims, 3 Drawing Sheets

METHOD FOR MEASURING LIQUID SCINTILLATION SAMPLES DEPOSITED ON MULTI-WELL SAMPLE PLATES

BACKGROUND OF THE INVENTION

Liquid scintillation counters are commonly used for measuring the count rate or activity of samples containing low energy beta particles or corresponding particles emitting radionuclides such as tritium and carbon-14.

The range of the low energy beta particles in the sample is generally few tens of micrometers at the most. As a consequence, the sample to be measured has to be placed in direct contact with the scintillation medium, which comprises a solvent or solvents and a solute or solutes present in a few percent by weight of the solutions. In this interaction process most of the kinetic energy of the interacted beta particle is absorbed by the solvent and then transferred to the solute which emits scintillation photons, whose amount is proportional to the energy of the interacted beta particle. These scintillation photons are detected usually by two, in coincidence operating, photomultiplier tubes producing electric pulses. The height of the pulses are proportional to the amount of emitted scintillation photons and thus proportional to the energy of the interacted beta particle.

When measuring sample activities with liquid scintillation counters, the basic problem is the reduction of the counting efficiency due to the quenching of the sample.

It is known in the liquid scintillation counting that the reduction of the counting efficiency due to the quenching of the sample can be corrected by a means of a quench curve which describes the relationship between the counting efficiency and the amount of quench of the sample.

Normally liquid scintillation counters are provided with one detector and they are designed to measure samples in 7 ml or 20 ml glass or plastic vials.

A novel liquid scintillation counter, which counts samples, directly from multi-well sample plates is described in International Patent Publication Number WO 89/12838 (Lehtinen et al.). The apparatus counts liquid scintillation or corresponding samples directly from sample plates which comprise several separate sample wells or vials. The apparatus has one or several detectors in order to count one or several samples at a time. The sample plate is placed in the counting position or pre-counting position manually or automatically on a rigid plate holder made of photon attenuating material and having holes for the wells of the sample plate. The walls of the holes are reflecting or scattering in order to guide the photons from the liquid scintillation sample to the detectors, built of two photomultiplier tubes operating in coincidence and situated on the opposite sides of the holes of the plate holder. The wells of the sample plate can be closed by an adhesive transparent tape. The apparatus can be used also for counting gamma radiation emitting samples if the holes of the sample plate are surrounded by gamma radiation sensitive detectors.

Another novel scintillation counting system for in-situ measurement of radioactive samples in a multiple-well plate is presented under European Patent Publication Number 0425767A1 (VanCauter et al.). This apparatus is provided with multiple photomultiplier tubes positioned adjacent to the sample wells containing the scintillator for simultaneously measuring the radioactivity of multiple samples with only a single photomultiplier tube sensing the scintillations from each well and converting the sensed scintillations into corresponding electrical pulses. The electrical pulses from each photomultiplier tube are processed to discriminate between pulses attributable to sample events within the wells and pulses attributable to non-sample events such as photomultiplier tube noise. The discrimination is effected by determining whether a selected number of electrical pulses occurs with a prescribed time interval, the occurrence of the selected number of pulses within the prescribed time interval signifying a sample event. Only the electrical pulses attributable to sample events are supplied to a pulse analyzer.

The multi-well sample plates have typically eight rows of wells, whose diameter is 7-8 mm arranged in twelve columns with d distance of 9 millimeters between the center points of the wells. The typical volumes of the sample wells of such 96-well sample plates are 200-400 microliters depending on the height of the plate. When the wells of the multi-well sample plate are separate, the plate can be placed for counting on a rigid sample plate holder made of photon attenuating material and having thru-holes for the wells of the sample plate as shown in the patent application published under international publication number WO 89/12838. As a consequence, an optically isolated compartment is formed around each sample well of the sample plate. Unfortunately most of the commercially available multi-well sample plates are transparent and the wells are joined together with ribs or the like in order to stiffen the sample plate. As a consequence of this it is impossible to isolate the wells optically. As a further consequence of this some amount of the scintillation photons produced by the absorption of the beta particle in a certain sample well may travel to other sample wells and thus produce an undesired increase in observed count rates in those wells. This phenomenon is called optical crosstalk. It is known that the use of opaque multi-well sample plates can reduce optical crosstalk as mentioned in TopCount Topics PAN0005 6/91, published by Packard Instrument Company, Meriden USA 1991. Unfortunately in many applications transparent multi-well sample plates are preferred, and most of the commercially available multi-well sample plates are transparent.

U.S. Pat. No. 4,348,588 (Yrjönen et al.) shows a crosstalk correction method applied in gamma counting. This method is not suitable for liquid scintillation counting because it does not take into account the variation of the quench of the samples, and it is limited to correcting only affection of samples, which are in pre-determined locations.

SUMMARY OF THE INVENTION

The present invention shows a novel method for correcting the errors of the measured count rate values, when measuring liquid scintillation samples having constant or variable quench levels deposited in sample plates comprising a plurality of sample wells, which counting error is caused by affection of samples deposited in other sample wells.

DETAILED DESCRIPTION OF THE PREFERRED EMBODIMENTS

Figure 1:
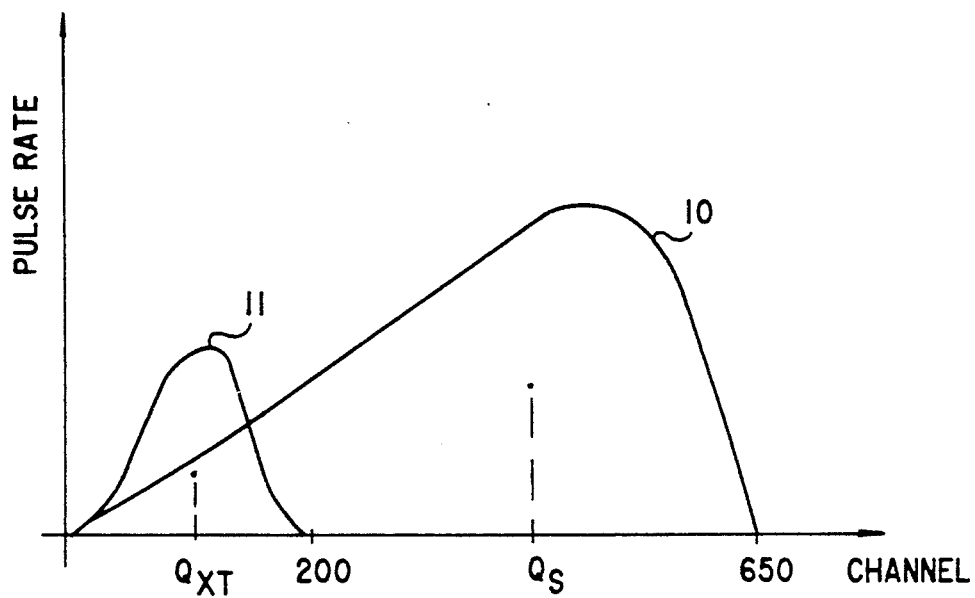
FIG. 1 shows a typical C-14 spectrum and its crosstalk spectrum.

Referring to FIG. 1 the inventors have found that the crosstalk spectrum 11 and the sample spectrum 10 differ substantially from each other. The crosstalk spectrum 11 is always in the lower energy region, because crosstalk light contains always a more reduced number of photons than the sample light, because certain amount of photons are absorbed during the travel and only some of the crosstalk photons are detected by the detector. As a consequence of this the inventors have concluded that the end point of the total spectrum, ISEP, depends only on the sample spectrum and thus it can be used as a quench level indicator of the sample.

The magnitude of crosstalk depends on the energy of the isotope, which the sample contains, as well as depending on the quench level of the affecting sample: the higher the quench the lower amount of the scintillation photons are available. In addition, the amount of crosstalk depends also on the distance between the detector and the affecting sample in a similiar way: the larger said distance the lower the amount of scintillation photons that comes to the detector.

The inventors have derived a mathematical model of the method in the following way:

The mean of the amplitude distribution Qtot of the total spectrum is $$Qtot = (CPMs*Qs + CPMxt*Qxt)/(CPMtot) \quad (Eq.1)$$

where
Qs = the mean of the amplitude distribution of the sample spectrum,
Qxt = the mean of the amplitude distribution of the crosstalk spectrum,
CPMs = the count rate of the sample spectrum,
CPMxt = the count rate of the crosstalk spectrum,
CPMtot = CPMs + CPMxt = the count rate of the total spectrum.

CPMs can be solved from Eq. 1:

$$CPMs = CPMtot*(Qtot - Qxt)/(Qs - Qxt). \quad (Eq. 2)$$

The activity of the measured sample can be solved using equation $$DPMs = CPMs/Es, \quad (Eq. 3)$$

where Es = the counting efficiency of the sample, which depends on the quench level (ISEP) of the sample.

Figure 3:
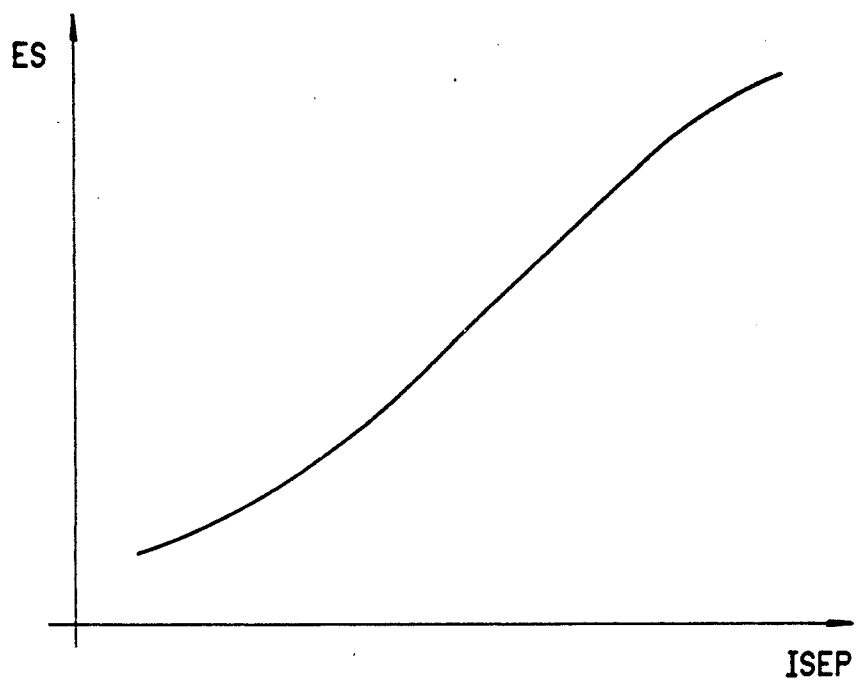
FIG. 3 is a diagram which illustrates a relationship between the counting efficiency and the ISEP.
Figure 4:
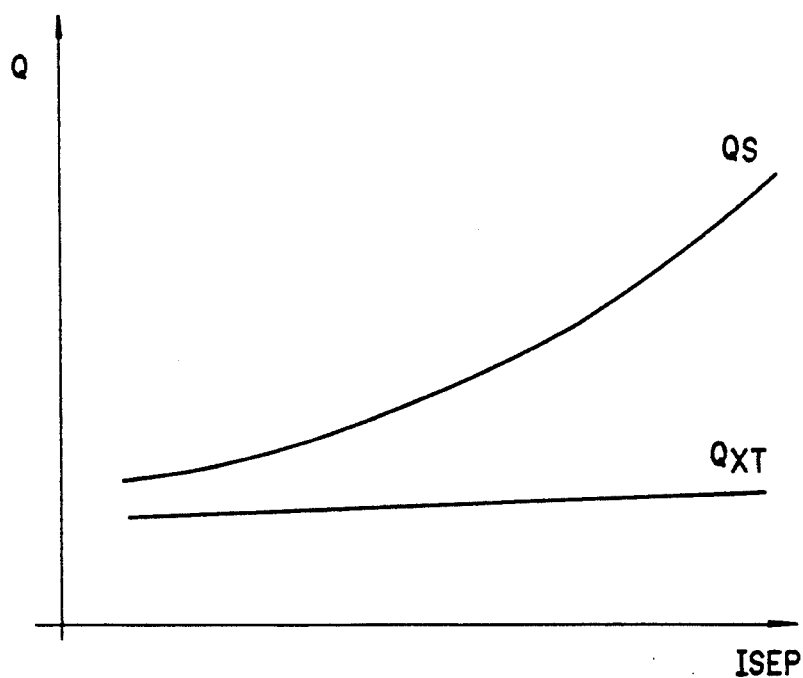
FIG. 4 is a diagram which illustrates
1) a relationship between the mean of the amplitude distribution of the sample spectrum Qs and the ISEP;
2) a relationship between the mean of the amplitude distribution of the crosstalk spectrum Qxt and the ISEP.

Equation 3 and equation 2 show that the activity of the sample (DPM) can be solved, if CPMtot, Qtot and quench level (ISEP) of the sample are measured and Es, Qxt and Qs are known as a function of the quench level of the sample in priori (FIG. 3 and 4).

I. Crosstalk Standardization

The purpose of this crosstalk standardization is to define and store for further use counting efficiency of the sample Es as a function of the quench level (FIG. 3) and the mean of the amplitude distribution of the sample spectrum (Qs) as a function of the quench level and the mean of the amplitude distribution of the crosstalk spectrum (Qxt) as a function of the quench level (FIG. 4). Here it is assumed that background count rates are much smaller than the increase in count rates due to the crosstalk, this means in practice that the activity of the isotope standards should be high enough.

Figure 2:
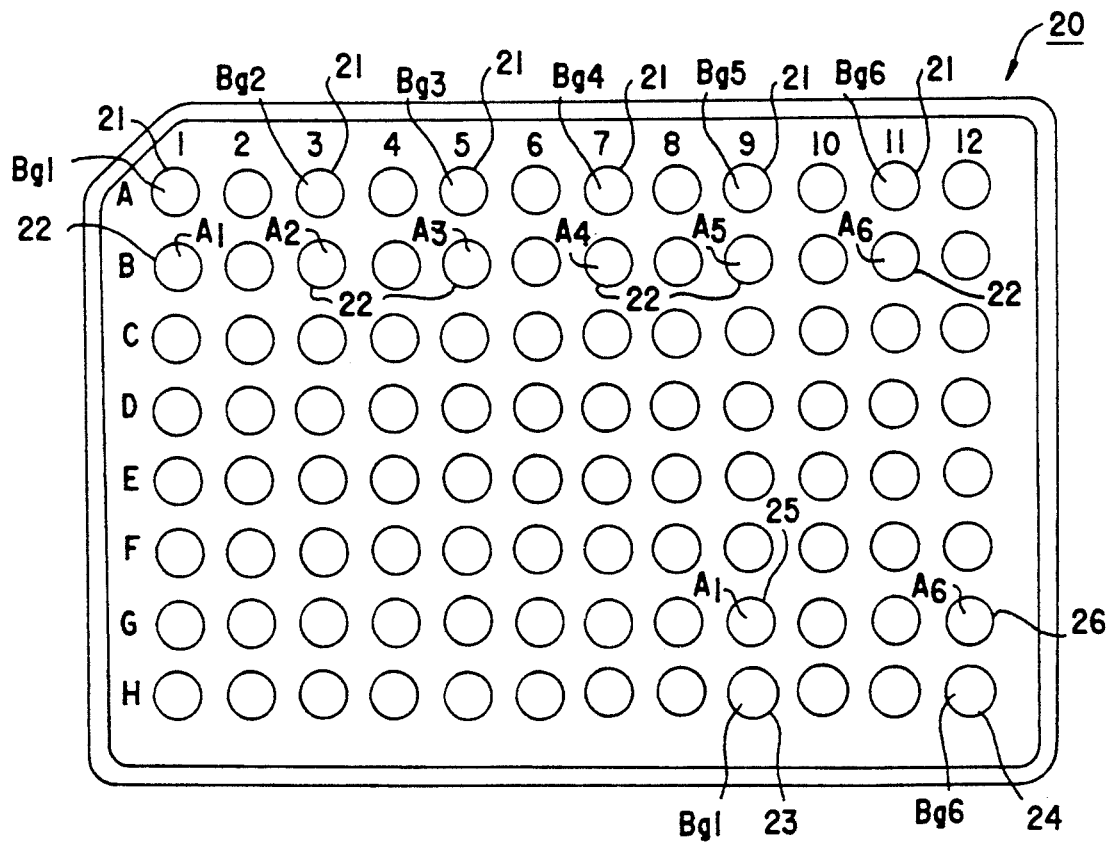
FIG. 2 shows the preferred positions for the standardization samples in a 96-well sample plate.

Referring to the FIG. 2 the following standardization samples are prepared a to similar sample plate 20 used for the samples to be analyzed:

Non-isotope standards with an increasing amount of quench are prepared deposited in the sample wells A01, A03, A05, A07, A09 and A11 marked by reference number 21 in FIG. 2. Isotope standards containing the same amount of activity but an increasing amount of quench are prepared are deposited in the sample wells B01, B03, B05, B07, B09, B11, marked by reference number 22 in FIG. 2. The quench level of corresponding isotope and non-isotope samples should be the same (quench level of A01 = quench level of B01, quench level of A02 = quench level of B02 etc.). The reason why isotope standards are deposited in every second well is that the inventors have found out that in practice the distance between the isotope standards is in this case long enough to prevent crosstalk between standardization samples. In addition the least quenched isotope standard in the well B01 is replicated in well G09, reference number 25, and the most quenched isotope standard in the well B11 is replicated in well G12, reference number 26, and the least quenched non-isotope standard is replicated in the sample well H09, reference number 23, and the most quenched non-isotope standard is replicated in the sample well H12, reference number 24.

The standardization procedure is as follows:
1) At first, isotope standards which are in the sample wells B01, B03, B05, B07, B09 and B11, are measured by the detector 1 and isotope standards which are in the wells G09 and G12 are measured by each detector.
2) The following standard curves of the detector one are then calculated and stored:

$$Es(q) = I(q)/A, \quad (I(q) = observed\ count\ rate;\ A = sample\ activity,\ i.e.,\ disintegrations\ per\ minute\ (DPM)) \quad (Eq. 4)$$

Qs(q) = the mean of the amplitude distribution of the sample spectrum as a function of the quench level q. For each detector the values of Es(G09), Es(G12), Qs(G09), Qs(G12), ISEP(G09) and ISEP(G12) are stored.

3) The standardization procedure continues automatically measuring the non-isotope standards, which are in the wells A01, A03, A05, A07, A09 and A11 by detector 1 and by measuring non-isotope standards, which are in the wells H09 and H12 in each detector.

The following standard curve for detector one is then calculated and stored:

Qxt(q) = the mean of the amplitude distribution of the crosstalk spectrum as a function of the quench level q.

For each detector the values of Qxt(H09) and Qxt(H12) are stored.

II. Correcting Measured Count Rates of the Samples to be Analyzed

Method 1:

1) Total count rate CPMtot,j, the mean of the amplitude distribution Qtot,j and the quench level (ISEPj) of an unknown sample are measured by detector j.
2) The ISEPj is converted to correspond ISEP1 of the detector 1 by linear interpolation using stored ISEP(G09) and ISEP(G12) values:

$$ISEP1 = ISEP(G12),1 + K1,j*(ISEPj - ISEP(G12),j), \quad \text{(Eq. 5)}$$

where $K1,j = (ISEP(G09),j - ISEP(G12),j)/(ISEP(G09),1 - ISEP(G12),1)$

3) Using ISEP1-value Es,1-, Qs,1- and Qxt,1-values are evaluated from the standard curves shown in FIG. 3 and FIG. 4.
4)
   a) The Es,1 is converted to the corresponding Es,j of detector j by linear interpolation using stored Es(G09) and Es(G12) values:

$$Es,j = Es(G12),j + Lj,1*(Es,1 - Es(G12),1), \quad \text{(Eq. 6)}$$

where $Lj,1 = (Es(G09),j - Es,(G12),j)/(Es(G09),1 - Es(G12),1)$.

b) The Qs,1 is converted to the corresponding Qs,j of detector j by linear interpolation using stored Qs(G09) and Qs(G12) values:

$$Qs,j = Qs(G12),j + Mj,1*(Qs,1 - Qs(G12),1), \quad \text{(Eq. 7)}$$

where
$Mj,1 = (Qs(G09),j - Qs(G12),j)/(Qs(G09),1 - Qs(G12),1)$.

c) The Qxt,1 is converted to the corresponding Qxt,j of detector j by linear interpolation using stored Qxt(H09) and Qxt(H12) values:

$$Qxt,j = Qxt(H12),j + Nj,1*(Qxt,1 - Qxt(H12),1), \quad \text{(Eq. 8)}$$

where $Nj,1 = (Qxt(H09),j - Qxt(H12),j)/(Qxt(H09),1 - Qxt(H12),1)$.

5) Activity of the unknown sample is calculated from Eq. 3 and Eq. 2 by substituting measured and above-calculated values.

In the above description of the first embodiment it was assumed that the quench level of the samples, which affect crosstalk, are in the same quench level as the sample to be analyzed. In the second embodiment a method is described, where the evaluated Qxt-value of a sample to be analyzed can be corrected by taking into account a possible difference in the quench levels of affecting samples.

Method 2:

Steps 1) and 2) are same as in Method 1.
3)
   a) Using ISEP1-value Es,1-, Qs,1-values are evaluated from the standard curves shown in FIG. 3 and FIG. 4 as in Method 1.
   b) Qxt' which is the weighted mean of the amplitude distribution of the spectrums of the samples, which are affecting crosstalk, is calculated from equation $$Qxt' = SUM(ai*CPMi*Qi)/SUM(ai*CPMi) \quad \text{(Eq.9)}$$

where i=adjacent wells of the sample to be analyzed, which is in well j:

| j − 13 | j − 12 | j − 11 |
|---|---|---|
| j − 1 | j | j + 1 |
| j + 11 | j + 12 | j + 13 |

Figure 5:
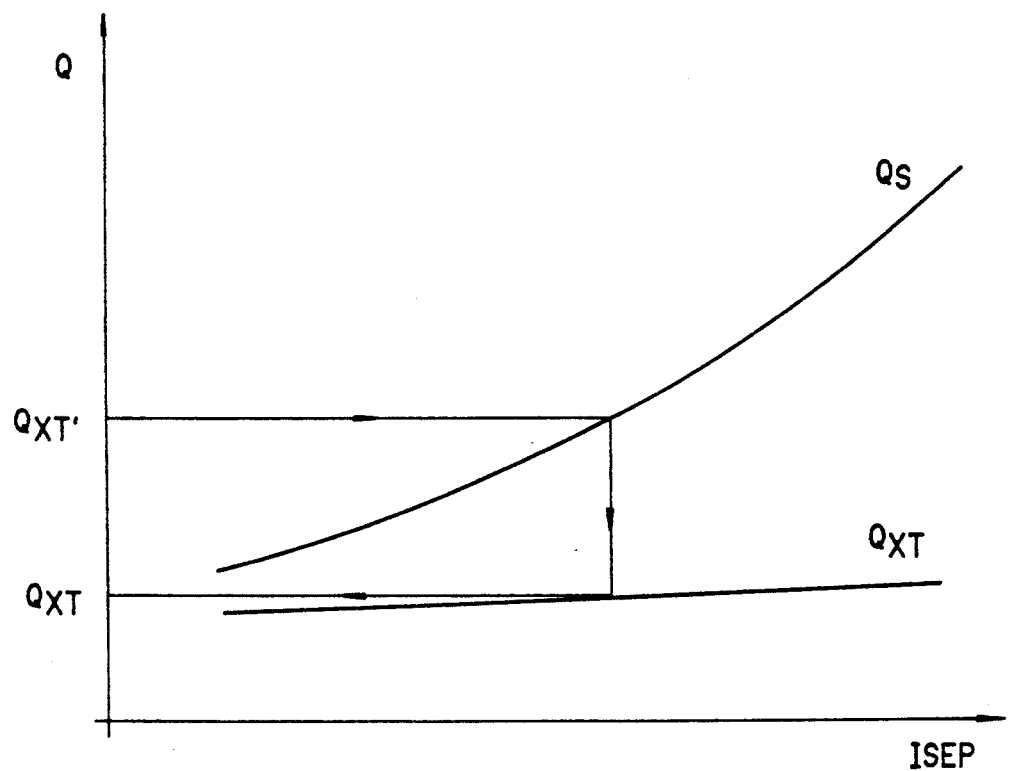
FIG. 5 is a diagram which illustrates how Qxt' is converted to Qxt using curves illustrated in FIG. 4.

$ai = 1$, if $i = j-12, j-1, j+1$ or $j+12$.
$ai = 0.1$, if $i = j-13, j-11, j+11$ or $j+13$.

c) In FIG. 5 is a diagram which illustrates how Qxt' is converted to Qxt using the curves illustrated in FIG. 4.

Steps 4) and 5) are same as in Method 1.

The method according to the present invention is not confined to the above descriptions alone, but may show considerable variation within the scope of the patent claims.

We claim:

1. Method for correcting measured values in a liquid scintillation counter when measuring samples deposited on a sample plate, where a detector in addition to detecting scintillation photons from the sample to be analyzed is affected by the scintillation photons from other samples on the sample plate, comprising:
   determining the quench level of the sample;
   establishing a first relationship between the counting efficiency (Es) and the quench level of the sample;
   determining, as a first quantity, the mean of the amplitude distribution of the sample spectrum (Qs);
   determining, as a second quantity, the mean of the amplitude distribution of the crosstalk spectrum (Qxt);
   establishing a second relationship between said first quantity and said quench level of the sample;
   establishing a third relationship between said second quantity and said quench level of the sample; and
   correcting the measured value (CPMtot) of said sample by applying said determined relationships.

2. Method according to claim 1, wherein the measuring value (CPM tot) of the said sample is corrected by using the formula $$DPMs = CPMtot*(Qtot - Qxt)/Es*(Qs - Qxt),$$

where Qtot = the mean of the amplitude distribution of said sample spectrum.

3. Method according to claim 1, wherein the end point of the amplitude distribution of the sample spectrum is used as a measure of the quench level of the sample.

4. Method according to claim 1, wherein the mean of the amplitude distribution of the crosstalk spectrum (Qxt) is corrected by taking into account a difference in the count levels of affecting samples.

* * * * *